June 13, 1967 D. J. BROWN 3,324,920
LOCK NUT
Filed July 6, 1965 2 Sheets-Sheet 1

INVENTOR.
DUDLEY J. BROWN
BY Williams, David,
Hoffmann & Yount
ATTORNEYS

United States Patent Office 3,324,920
Patented June 13, 1967

3,324,920
LOCK NUT
Dudley J. Brown, Rocky River, Ohio, assignor to The Lamson & Sessions Co., Cleveland, Ohio, a corporation of Ohio
Filed July 6, 1965, Ser. No. 473,554
4 Claims. (Cl. 151—21)

This application is a continuation-in-part of application Ser. No. 222,353, filed Sept. 10, 1962, now abandoned.

This invention relates to lock nuts for use on threaded stems and provides a novel form of lock nut which can be rapidly and economically manufactured and which will produce an effective locking action on the threaded stem to which the nut is applied.

In the manufacture of lock nuts of the kind having a distorted portion for producing the locking action it has usually been the practice to first form nut bodies by cold working of metal blanks in suitable die apparatus and to then tap the bodies, and thereafter distort the threaded nut body by a subsequent operation. This procedure has accordingly required three operational procedures or handlings for the nut bodies, namely forming, tapping and distorting, and this number of different and successive operational handlings is reflected in the cost of the lock nuts produced.

The present invention provides a novel lock nut which requires fewer operational handlings and which can therefore be produced more rapidly and economically. As will be explained hereinafter, the novel lock nut can be produced by only two operational handlings, namely, forming and tapping.

In keeping with what has been explained in general terms above, this invention provides a novel lock nut comprising a formed metal body including a collar portion of a reduced transverse dimension having gripping portions and recesses at alternately spaced locations around the axial opening of the nut, the metal body having a conventional screw thread on one portion of the wall of the nut opening, and an unthreaded wall portion within the collar portion of the opening which is subject to indentation by the thread of a co-operating stem or screw for producing the locking action, the collar portion expanding outwardly during the indentation, the threaded portion of the nut opening preferably including a tapered portion of incomplete threads for leading the thread of the stem smoothly into the unthreaded portion.

The present invention also provides a new and improved lock nut wherein a resilient collar formed by a reduced portion at one end of the nut body is resiliently expanded when the nut is threaded onto a cooperating thread stem by thread interference in the collar portion including thread interference with incomplete thread convolutions of the same crest diameter as the threads of the nut body formed on a wall of the collar portion which is integral at its inner end with the nut body for substantially the entire circumferential and transverse extent of the wall at its inner end with the collar portion having recessed portions for receiving swaged metal from the threads which portions have a radial depth greater than the conventional root diameter for the threads in the nut body and preferably a circumferential extent at least as great as the extent of said incomplete thread convolutions.

The present invention further provides a new and improved method of forming a lock nut on which the side walls of the nut body and a resilient reduced collar portion thereon are not distorted after their formation to provide the locking action in the collar portion.

Additionally, this invention provides such a novel lock nut having an annularly corrugated collar portion which includes recesses between the gripping portions to accommodate metal displaced from the latter during the formation or deepening of thread convolutions thereon.

Other objects, novel characteristics, and advantages of this invention will be apparent in the following detailed description and in the accompanying drawing forming a part of this specification and in which, FIG. 1 is an end elevation of a lock nut embodying this invention and showing the nut as viewed from the locking end thereof;

Figure 1:
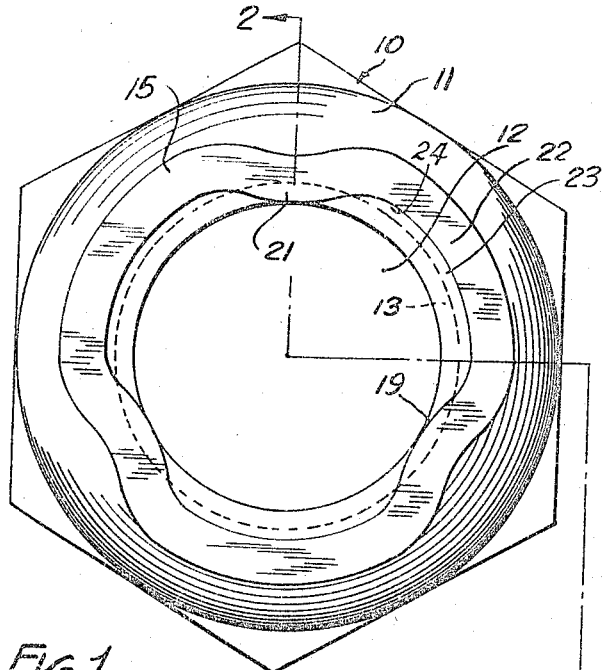
Figure 2:
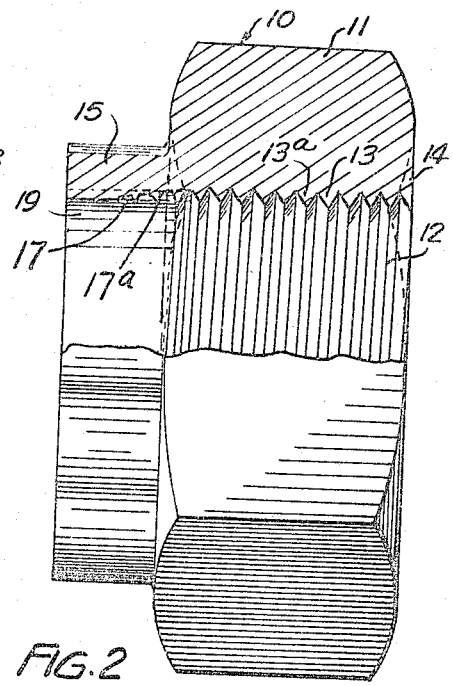
FIG. 2 is a side elevational view of the nut showing the same in partial axial section, the view being taken as indicated by section line 2—2 of FIG. 1.

As one embodiment of this invention, FIGS. 1 and 2 of the drawing show a lock nut 10 comprising a metal body 11 having an opening 12 extending axially thereinto and provided with a screw thread 13. At one end thereof the body 11 is provided with an annular clamping surface 14 in surrounding relation to the opening 12. For a purpose to be explained hereinafter the body 11 is provided at the other end thereof with a section of a reduced transverse dimension and which is here shown in the form of a collar portion 15. The opening 12 is shown as extending entirely through the nut body 11 including the collar portion 15 thereof.

The screw thread 13 is suitably formed on the wall of the opening 12, starting at or adjacent the end surface 14, as by a tapping operation and comprises standard thread convolutions 13ª of a conventional form and extending along the opening for the major portion of the length thereof. The threaded portion of the opening 12 also includes an axially tapered portion 17 at the inner end of the series of fully-formed conventional thread convolutions 13ª which terminates on the collar portion 15. The tapered portion 17 extends along a shorter or minor portion of the length of the opening 12 and comprises a smaller number of partially-formed thread convolutions 17ª having a root diameter which progressively decreases from the standard root diameter for the threads 13ª in a direction away from the inner end of the fully-formed threaded portion. The tapered portion 17 can be conveniently referred to as the run-out portion of the screw thread 13 such as is produced by the entering end portion of the tap used in threading the opening 12.

The opening 12 also includes an unthreaded wall portion 19 having a smooth inner surface at the remote or trailing end thereof and which likewise extends for a minor portion of the length of the opening 12. The diameter or minimum transverse dimension of the unthreaded portion 19 is here shown as being approximately the same as the diameter of the tops of the thread convolutions 13ª.

The tapered portion 17 of the thread 13 and the unthreaded wall portion 19 comprise locking portions on the nut 10 for co-operation with a threaded stem (not shown) such as that of a conventional screw or bolt when one of the other is screwed into the opening. The threaded portion comprising the fully-formed conventional thread convolutions 13ª affords a free and easy entry of the threaded stem into the opening 12 and for a substantial length of thread engagement with the stem before the inner end of the stem reaches the tapered portion 17.

As the threaded stem advances further along the opening 12, the thread convolutions of the stem follow the partial-depth convolutions 17 of the tapered portion 17 and produce a deepening thereof by an indenting of the threads of the stem into the nut body 11 in a manner somewhat similar to the action of a tapping tool. This indenting action by the thread of the stem in the tapered portion 17 will result in a tightly locked engagement between the stem and the nut body 11 for holding these members in a connected relation.

Continued relative rotation between the nut 10 and the threaded stem will result in the inner end of the stem advancing into and along the unthreaded portion 19. The movement of the thread convolutions of the stem along the unthreaded portion 19 will result in the indentation of thread convolutions into this portion of the wall of the opening 12 which will likewise be in the nature of a threading action somewhat similar to that produced by a tapping tool. This indentation of the thread convolutions of the stem into the wall of the unthreaded portion 19 will result in a tight locking engagement between the stem and nut body 11 for further preventing loosening rotation therebetween.

It will be noted that in FIG. 2, the partial or incomplete thread convolutions may start in the body but extend into the collar portion and that the root diameter of the thread convolutions progressively decrease to progressively require additional indentation to form making thread in the collar portion. The forces resisting indentation will tend to expand the collar portion.

The nut body 11 is suitably formed as by cold-working of a metal blank in suitable die apparatus whereby a desired external shape is imparted to the nut body, such as the hexagonal shape shown in FIGS. 1 and 2 of the drawing, and which formed external shape produced by the die apparatus includes the collar portion 15. The die apparatus used for thus forming the nut body 11 is of such a character that the formed shape of the collar 15 on the nut body is of the reduced transverse dimension referred to above.

The invention contemplates having the collar portion 15 formed integral with the nut body 11 by the die apparatus in such a manner that the collar portion has axially extending inwardly offset gripping portions 21 at spaced points or locations around the inside of the opening 12 as shown in FIG. 1. The gripping portions are here shown as being inwardly offset such that they lie on a circle having a diameter which is the same as the diameter of the tops or crests of the thread convolution 13ᵃ. The outer periphery of the collar portion 15 can be circular in shape as in the case of the collar portion of the modified form of nut shown in FIGS. 3 and 4 and described hereinafter or, as shown in FIG. 1, the collar portion can be of an annularly corrugated shape. When such a corrugated shape is provided the collar 15 includes lobe portions 22 located between and connecting the gripping portions 21 so as to define a collar portion having alternately spaced inwardly gripping portions 15 and lobe portions 22. The lobe portions 22 have an outwardly bowed shape and an inner surface 24 which is spaced radially outwardly from the gripping portion 21. The lobe portions provide recesses 23 extending axially of the collar portion 15 and alongside of the gripping portions 21 for receiving or accommodating metal swaged or displaced from the gripping portion 21 from the collar or the stem by the thread interference. The radial depth of the recesses 23 is greater than the conventional root diameter for the threads in the nut body.

The collar portion 15 has a limited flexibility so that the gripping portions 21 can be displaced outwardly when the threaded stem enters the opening 12 and has a self-contracting capability by which the gripping portions will be pressed against the threaded stem for producing a locking action for the nut 10. This flexibility of the collar portion 15 is enhanced by the above-described corrugated shape. The expansive locking action produced by the gripping portions 21 assists or supplements the locking action produced by the indenting of the threaded convolutions of the stem in the gripping portions 21 along the unthreaded wall portion 19 of the opening 12.

From the construction of the lock nut 10 as shown in the drawing and described above it will now be understood that gripping of the threaded stem by the nut for producing a desired locking action therebetween is achieved, first, by the further indenting of the threads of the stem into the partially-threaded tapered portion 17 of the nut body 11. A locking action is also achieved, as explained above, by the indenting of the threads of the stem into the unthreaded portion 19 of the collar portion 15, as well as by the self-contracting flexibility of the collar portion by which the gripping portions 21 thereof are pressed inwardly against the threaded stem. The locking effect thus achieved between the nut 10 and a threaded stem advanced thereinto will accordingly be very effective for preventing undesired loosening between the nut and stem, but will still permit unscrewing therebetween as well as a reapplication during which the locking action is again achieved to a substantial extent by the gripping effect of the gripping portions 21.

Figure 3:
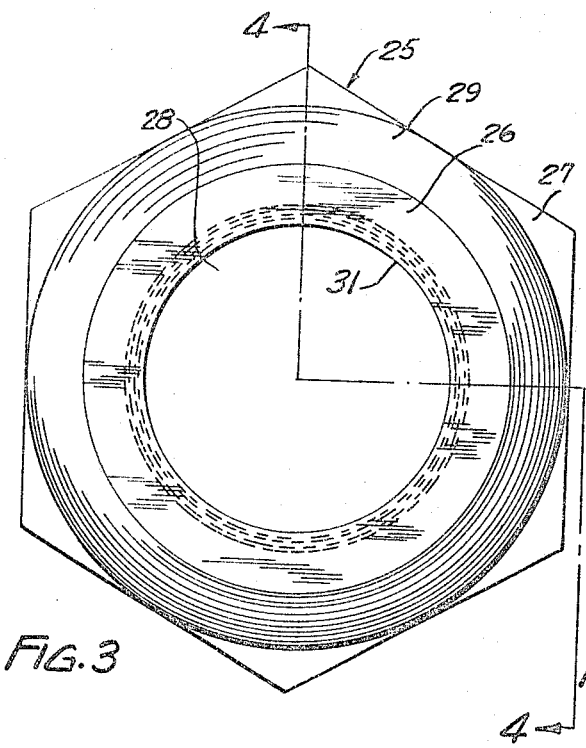
FIG. 3 is an end elevation similar to that of FIG. 1 but showing a modified form of lock nut.
Figure 4:
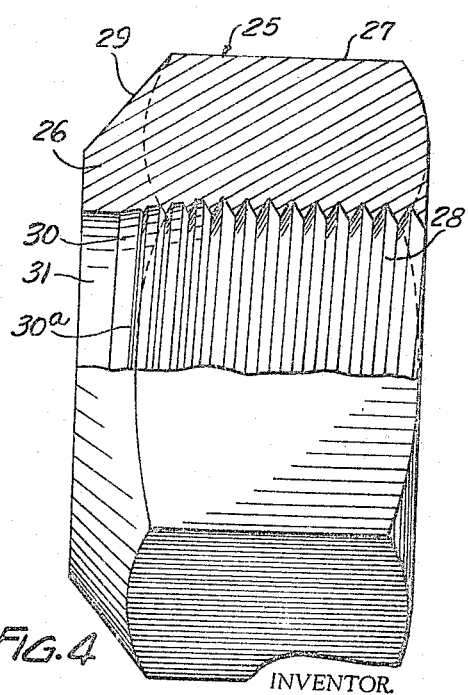
FIG. 4 is a side elevational view showing the nut of FIG. 3 in partial axial section, the view being taken as indicated by section line 4—4 of FIG. 3.

FIGS. 3 and 4 of the drawing show a modified form of lock nut 25 of a construction generally similar to that of the lock nut 10 and which functions in a similar manner with the exception that the collar portion 26 of the nut body 27 is not of the annularly corrugated form described above for the collar portion 15. The collar portion 26 is obtained on the nut body 27 during the forming operation by flowing metal so that the desired shape is imparted to the lock nut 25 including the collar portion without requiring a distorting or severing operation.

The collar portion 26 is of a reduced dimension transversely of the nut body 27 so as to have a limited flexibility for expansion thereof by a threaded stem being advanced into the threaded nut opening 28. The flexibility of the collar portion 26 provides for self-contraction thereof around the threaded stem for gripping the latter. The collar portion 26 is here shown as having an axially tapered annular surface 29 extending therearound so that the collar portion has substantially the shape of a truncated cone into, or through which the tapered and unthreaded portions 30 and 31 of the nut opening 28 extend.

The tapered portion 30 has partially formed threaded convolutions 30ᵃ on the wall thereof which lead the advancing end of the threaded stem into the untheaded portion 31 in the same manner and for the same purpose as was described above for the tapered portion 17 of the lock nut 10. The movement of the threaded stem into the unthreaded portion 31 causes the thread of the stem to be indented into the wall of the unthreaded portion by which thread convolutions are formed on the latter in the manner and for the nut locking purpose already described above in connection with the unthreaded portion 19 of the lock nut 10. The self-contracting gripping effect of the collar portion 26 increases the locking action resulting from the formation of thread convolutions by the stem in the unthreaded portion 31.

Figure 6:
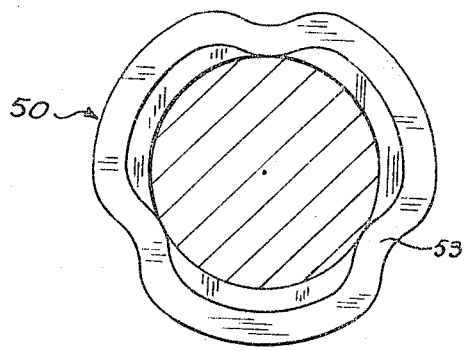
FIG. 6 is a cross-sectional view of the punch shown in FIG. 5.
Figure 5:
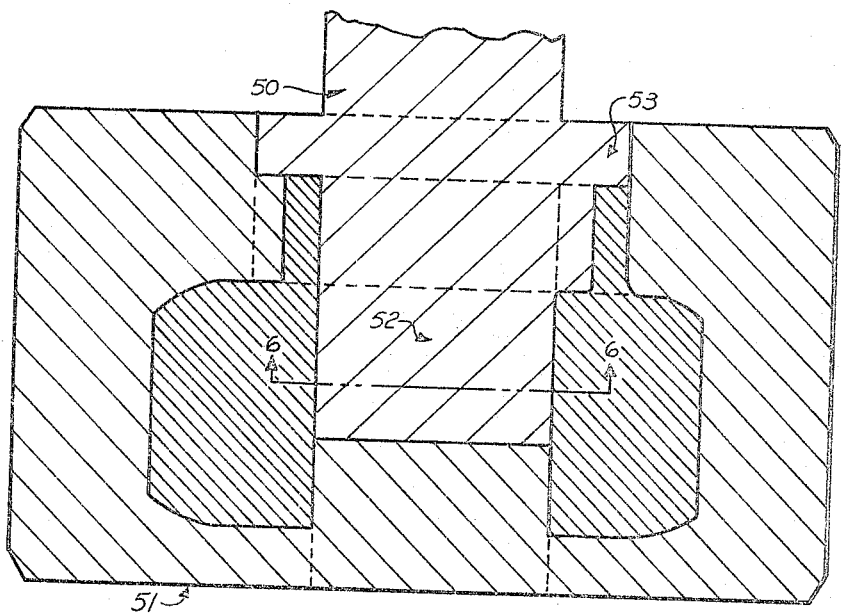
FIG. 5 is a cross-sectional view showing cold working apparatus for flowing metal to form a nut blank in accordance with the present invention.

One of the features of the present invention is that the lock nut 10 is such that it can be formed without requiring any separate distorting operations which not only increases the handling of the lock nut but introduces manufacturing problems in that the freely running thread portion or the opening therefor may also be distorted. Accordingly, in accordance with the preferred embodiment, the lock nut 10 is formed preferably in a cold forming operation where a female die and a cooperating punch is used to form a slug of metal into an unthreaded nut blank which corresponds in shape and configuration to the lock nut 10 except for the threading operation. FIG. 5 illustrates a cooperating punch 50 and a die 51 for forming the nut blank and FIG. 6 illustrates the punch 50 of the apparatus of FIG. 5. Referring to FIG. 5, the female die member 51 for receiving the punch 50 is shaped to provide the nut body and the exterior periphery of the collar of the nut. The punch has a portion 52 of uniform cross section for forming the opening in the lock nut body and a stepped lobed portion 53 for forming the interior wall of the resilient collar and the end face thereof. A metal slug is placed in the female die cavity and is rearwardly and forwardly extruded by relative movement of the tool members axially of the nut body to form the nut body with the collar portion. It will be understood by those skilled in the art that in certain instances, it may be desirable to form the nut in a series of stations where the nut is flowed into shape by successive punches which move parallel to the axis of the nut body. For example, the punch or punches and cooperating die or dies could be shaped to form the exterior configuration of the blank in one or two cold metal working operations and then the hole punched through the blank in a separate operation. However, the forming is such that the nut blank or collar is not subject to transverse distorting forces after the forming of the axial opening therethrough. That is, the internal and external wall of the collar portion is initially formed in its final position on the nut body and is not first formed and then distorted to its final position.

After the nut blank is so formed, then the nut blank may be tapped by a conventional cutting tap to cut the standard conventional threads in the nut body and to form the partial or incomplete threads in the collar. The tapered run-out portion of the tap may be utilized to form a partial or incomplete thread in the collar.

Extremely fine control of the threading operation and of the partial or incomplete threads is obtained by threading the internal wall of the collar which is fully integral with the nut body at its inner end as in the illustrated embodiment. Moreover, since there is no need to distort the nut body in the described mode of manufacture by forces applied transversely to the axis thereof after the formation of the opening in the nut body, there is no tendency to deform the opening to be threaded or the threads which are intended to be free-running threads.

It can now be seen that the annularly corrugated collar shown in FIG. 1 provides continuous wall means defining the inner and outer walls of the collar and which is integral at the base thereof with the nut body for substantially the entire circumferential and transverse extent of the wall means and which is corrugated so as to provide convexly curved radially innermost portions which are subscribed by a circle of the same diameter as the crest diameter of the standard thread convolutions and on which the incomplete thread convolutions are formed and concavely curved recessed portions for receiving the metal swaged by the interfering thread. It will be noted that the metal receiving portions of the collar extend radially outwardly to a depth greater than the standard root diameter for the threads and have a circumferential extent at least as great as that of the incomplete thread convolutions. The corrugated collar also provides a shape which aids in obtaining fine control of the locking action of the nut.

The reduced collar portion has sufficient resilient expansion to enable a prevailing torque to be obtained when the nut is threaded onto the threaded stem which is of a reasonable value but yet is stiff enough and has sufficient resiliency to assure a tight gripping and locking action. In view of the fact that no distortion of the collar occurs after the opening through the nut is formed, extremely fine control can be obtained between the interfering threads. While the reduced portion of the collar is expansible, the integral nature of the collar and the use of a conventional cutting tap provides an extremely close control for the thread convolutions formed in the inner wall of the collar. The control of the prevailing torque is also aided by the corrugated form of the collar.

From the accompanying drawing and the foregoing detailed description, it will now be readily recognized that this invention provides a novel lock construction and method of manufacture which requires fewer operational handlings in commercially producing the lock nuts and with a consequent lower cost and provides fine control of the locking action. As explained in an earlier part of this specification, the reduced operational handlings required result from the fact that whereas lock nuts have heretofore been produced by three operations, namely forming, tapping and distorting, the novel construction herein disclosed results in the production of lock nuts by only two operational handlings, namely forming and tapping. It will now also be recognized that since there has been no distortion of the conventionally threaded portion of the nut opening or the opening therefor, the starting and advancing of the threaded stem in the nut opening will be easy and unimpeded.

Although the lock nut construction of this invention has been illustrated and described herein to a somewhat detailed extent it will be understood, of course, that the invention is not to be regarded as being limited correspondingly in scope but includes all changes and modifications coming within the terms of the claims hereof.

Having described my invention, I claim:

1. A lock nut for cooperating with conventional thread convolutions on an externally threaded stem comprising a metal body having an axially extending opening therethrough and an undistorted radially resilient reduced annular portion at one end of said opening comprising first standard screw thread convolutions on said body extending inwardly from the end of said opening remote from said reduced portion and adapted to freely engage the thread on said stem, said first thread convolutions terminating adjacent said reduced portion and having a uniform root diameter, said reduced annular portion being adapted to interfere with the thread on said stem and comprising a plurality of undistorted incomplete thread convolutions forming an extension of said standard thread convolutions and adapted to interfere with threads on said stem, the thread interference in said reduced annular portion radially expanding said reduced annular portion when the nut is threaded onto said stem, said first and second thread convolutions having the same crest diameters and the interference of the threads of said stem and said reduced annular portion effecting a swaging of metal when applied to said stem, said reduced annular portion having recessed portions which are in communication with said opening therethrough and which are recessed to a radial depth greater than the root diameter for the standard thread for freely receiving said stem for receiving metal swaged by the interference between the reduced annular portion and the threads of said stem, said reduced portion comprising a closed wall means encompassing said opening and comprising an outer wall and an inner wall on which a plurality of said incomplete thread convolutions are formed with the inner end of said closed wall means being integral with said body for substantially the entire circumferential and transverse extent of said closed wall, said reduced annular portion comprising a collar annularly corrugated in form with said inner wall having alternately spaced convexly and concavely curved portions, as viewed from the axis of the nut, with said incomplete thread convolutions being formed on said convexly curved portions and with said concavely curved portions being disposed radially outwardly of said convexly curved portions to provide said recessed portions.

2. A lock nut for cooperating with standard thread convolutions on an externally threaded stem comprising a metal nut body having an axially extending opening therethrough and a resilient reduced annular portion substantially reduced in average wall thickness as compared to the nut body disposed at one end of said metal body and integral therewith and through which said opening extends, a screw thread convolution formed on the side wall of said opening comprising first standard screw thread convolutions on said body extending inwardly from the end of said opening remote from said reduced portion and adapted to freely engage the thread on said stem, said first thread convolutions terminating adjacent said reduced portion and having a uniform root diameter, said reduced annular portion comprising an annularly corrugated closed collar having its inner end adjacent said body and integral with said body for substantially the entire circumferential and transverse extent thereof and having an inner wall extending about said opening and defining alternating convexly and concavely curved portions with the convexly curved portions extending inwardly substantially to the crest diameter of said first thread convolutions and having incomplete thread convolutions thereon forming an extension of said first thread convolutions and the concavely curved portions extending radially outwardly to provide unthreaded recessed portions for receiving swaged metal from said convexly curved portions, said incomplete screw thread convolutions having the same crest diameter as the crest diameter of said first screw thread convolutions and having a root diameter which progressively decreases proceeding from the inner end of said first screw thread convolutions toward the outer end of said reduced annular portion, the circumferential extent of said recessed portions being substantially greater than the circumferential extent of said convexly curved portions having said incomplete thread convolutions thereon, said recessed portions extending radially outwardly to a depth greater than the root diameter for the standard threads in the body portion.

3. A lock nut for cooperating with standard thread convolutions on an externally threaded stem comprising a metal nut body having an axially extending opening therethrough and an undistorted radially resilient annular portion reduced substantially in average wall thickness as compared to the nut body at one end of said metal body and integral therewith through which said opening extends, a screw thread convolution formed on the side wall of said opening comprising first standard screw thread convolutions on said nut body extending inwardly from the end of said opening remote from said reduced annular portion and adapted to freely engage the thread on said stem, said first standard thread convolutions terminating adjacent said reduced annular portion and having a uniform root diameter, said reduced annular portion being adapted to interfere with the thread on said stem and comprising a plurality of undistorted incomplete thread convolutions forming an extension of said first standard thread convolutions and which are adapted to interfere with threads on said stem, the thread interference in said reduced annular portion radially expanding said reduced annular portion when the nut is threaded onto said stem, said first and second thread convolutions having the same crest diameters and the interference of the threads on said stem and said reduced annular portion effecting a swaging of metal, said reduced annular portion having recess spaces which are in communication with said opening therethrough and which extend to a radial depth greater than the root diameter for the standard thread for freely receiving said stem for receiving metal swaged by the interference between the reduced annular portion and the threads of said stem, said reduced annular portion comprising wall means defining the inner and outer walls of said reduced annular portion and with a plurality of said incomplete thread convolutions being formed on said inner wall, said wall means being integral with said nut body at its inner end for substantially the entire circumferential and transverse extent of the wall means and said spaces for receiving metal having a circumferential extent at least as great as the circumferential extent of said incompleted thread convolutions.

4. A lock nut for cooperating with a threaded stem comprising a nut body having an opening extending axially therethrough, said opening having a threaded wall portion, an unthreaded wall portion axially spaced from said threaded wall portion and a tapered wall portion between said threaded and unthreaded wall portions formed by partial depth thread convolutions having a root diameter which progressively decreases from said threaded portion toward said unthreaded portion, said nut body including an integrally formed axially extending collar portion having a continuous wall surrounding said opening along said unthreaded and axially tapered wall portions, said collar portion having a smooth inner surface forming said unthreaded wall portion and having a wall thickness which is substantially less than the wall thickness of the nut body surrounding said threaded wall portion, said collar portion having an annularly corrugated shape providing axially extending, inwardly offset gripping portions and axially extending lobe portions at alternately spaced locations around said opening, said partial depth thread convolutions of said axially tapered portion along the gripping portions having a crest diameter and said inwardly offset gripping portions having smooth inner surfaces lying in a circle having a diameter which is less than the thread root diameter and at least as large as the thread crest diameter of said threaded portion of the nut body, said lobe portions between said gripping portions having an inner surface which is spaced outwardly of said inwardly offset gripping portions, said threaded wall portion extending around and along said opening from one end thereof and for a major portion of its length for engagement with the thread of said stem, said partial depth thread convolutions of said axially wall tapered portion being subject to deepening by the thread of the stem for producing a first locking action between the nut and the stem and for smoothly leading the thread of said stem onto the unthreaded portion, the inwardly offset gripping portions along said unthreaded portion being subject to thread forming indentation by the thread of said stem for producing a second locking action between the nut and the stem and said lobe portions defining recesses for receiving and accommodating metal displaced from said gripping portion by the threaded stem during the thread forming indentations, said collar portion being subject to expansive flexing by said stem during the thread forming indentations for increasing said locking actions.

References Cited

UNITED STATES PATENTS

| | | |
|---|---|---|
| 226,450 | 4/1880 | Ibbotson et al. _____ 151—22 |
| 1,210,508 | 1/1917 | Marye. |
| 1,321,894 | 11/1919 | Dake. |
| 1,425,591 | 8/1922 | Jaques. |
| 1,449,243 | 3/1923 | Peckham et al. _____ 151—5 |
| 1,966,613 | 7/1934 | Cole. |
| 2,179,157 | 11/1939 | MacDonald. |
| 2,393,323 | 1/1946 | Hungerford et al. _____ 151—7 |
| 2,437,751 | 3/1948 | Mitchell _____ 151—22 |
| 2,454,444 | 11/1948 | Poupitch. |
| 2,549,939 | 4/1951 | Shaw et al. _____ 151—7 |
| 2,871,492 | 2/1959 | Sciullo. |
| 2,879,820 | 3/1959 | Trzcinski. |
| 2,955,301 | 10/1960 | Burt _____ 10—72 |
| 3,139,636 | 7/1964 | Abbott. |

CARL W. TOMLIN, *Primary Examiner.*

MARION PARSONS, JR., EDWARD C. ALLEN, THOMAS F. CALLAGHAN, *Examiners.*